US006311219B1

(12) United States Patent
Factor (10) Patent No.: US 6,311,219 B1
(45) Date of Patent: *Oct. 30, 2001

(54) SYSTEM AND METHOD FOR LOCATING RESOURCES IN A DISTRIBUTED NETWORK

(75) Inventor: Michael Edward Factor, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,262

(22) Filed: Feb. 8, 2000

Related U.S. Application Data (62) Division of application No. 08/772,705, filed on Dec. 23, 1996, now Pat. No. 6,058,423.

(51) Int. Cl.$^7$ .................................................. G06F 15/16
(52) U.S. Cl. ........................ 709/229; 209/226; 209/223; 209/224
(58) Field of Search ................................. 709/226, 229, 709/223, 224, 104

(56) References Cited

U.S. PATENT DOCUMENTS

| | | | |
|---|---|---|---|
| 4,430,699 | 2/1984 | Segarra et al. ...................... | 364/200 |
| 4,980,818 | 12/1990 | Shinmura ............................ | 364/200 |
| 5,111,389 | 5/1992 | McAuliffe et al. .................. | 395/800 |
| 5,117,350 | 5/1992 | Parrish et al. ....................... | 395/425 |
| 5,222,242 | 6/1993 | Choi et al. ........................... | 395/800 |
| 5,249,290 | 9/1993 | Heizer ................................. | 395/650 |

(List continued on next page.)

FOREIGN PATENT DOCUMENTS 10125634  5/1998  (JP) .

OTHER PUBLICATIONS

IBM Technical Disclosure Bulletin, T. Anthias, "Inter–Client Usage in Distributed Client–Server Presentation Manager System," vol. 34, No. 4B, Sep. 1991, pp. 416–417.
IBM Technical Disclosure Bulletin, J. M. Knapman, "Generating Specific Server Programs in Distributed Object–Oriented Customer Information Control System," vol. 38, No. 01, Jan. 1995, pp. 411–414.
IBM Technical Disclosure Bulletin, G. L Child et al., "Migration Utility for Distributed Computing Environment Application Enabler for OS/2," vol. 38, No. 03, Mar. 1995, pp. 473–476.
J. David Narkiewicz, "Pilgrim's OSF DCE–based Services Architecture," Intern DCE Workshop Proc, Oct. 7–8, 1993.
Thomas T. Kwan et al., "NCSA's World Wide Web Server: Design and Performance," Computer, Nov. 1995, pp. 68–74.
IBM Technical Disclosure Bulletin, J. Derby et al., "Scoping Multicasts in Wan–Interconnected Local Networks," vol. 34, No. 8, Jan. 1992, pp. 68–71.

(List continued on next page.)

*Primary Examiner*—Dung C. Dinh
*Assistant Examiner*—Abdullahi E. Salad
(74) *Attorney, Agent, or Firm*—Steven W. Roth (57) ABSTRACT

Disclosed is a system and method for implementing a distributed network system, such as the World Wide Web, in which distributed location services are utilized and include a collection of server processes that map from resource identifiers to a resource's controlling server. In addition, distributed location services provide an architecture for assigning resource identifiers and set of protocols for accessing server processes. The server processes are logically defined to provide a more flexible system. Each of these logical server processes are an abstraction which provides the external view of the server. The logical server processes may be implemented by different numbers of physical processes running on different machines at different points in time.

2 Claims, 3 Drawing Sheets

U.S. PATENT DOCUMENTS

| | | | | |
|---|---|---|---|---|
| 5,301,337 | | 4/1994 | Wells et al. | 395/800 |
| 5,341,478 | | 8/1994 | Travis, Jr. et al. | 395/200 |
| 5,369,570 | | 11/1994 | Parad | 364/401 |
| 5,371,852 | | 12/1994 | Attanasio et al. | 395/200 |
| 5,390,297 | | 2/1995 | Barber et al. | 395/200 |
| 5,459,837 | | 10/1995 | Caccavale | 395/184.01 |
| 5,483,652 | * | 1/1996 | Sudama et al. | 707/10 |
| 5,511,208 | * | 4/1996 | Boyles et al. | 709/223 |
| 5,548,506 | | 8/1996 | Srinivasan | 364/401 |
| 5,548,724 | | 8/1996 | Akizawa et al. | 395/200.03 |
| 5,572,643 | | 11/1996 | Judson | 395/793 |
| 5,603,029 | | 2/1997 | Aman et al. | 395/675 |
| 5,678,041 | | 10/1997 | Baker et al. | 395/609 |
| 5,715,395 | | 2/1998 | Brabson et al. | 395/200.13 |
| 5,751,961 | | 5/1998 | Smyk | 395/200.47 |
| 5,764,906 | | 6/1998 | Edelstein et al. | 395/200.49 |
| 5,765,154 | | 6/1998 | Horikiri et al. | 707/10 |
| 5,768,510 | | 6/1998 | Gish | 395/200.33 |
| 5,774,660 | | 6/1998 | Brendel et al. | 395/200.31 |
| 5,778,185 | * | 7/1998 | Gregerson et al. | 709/226 |
| 5,787,435 | | 7/1998 | Burrows | 707/102 |
| 5,793,968 | * | 8/1998 | Gregerson et al. | 709/209 |
| 5,802,299 | | 9/1998 | Logan et al. | 395/200.48 |
| 5,815,665 | | 9/1998 | Teper et al. | 395/200.59 |
| 5,822,532 | * | 10/1998 | Ikeda | 709/224 |
| 5,892,905 | | 4/1999 | Brandt et al. | 395/187.01 |
| 5,944,780 | * | 8/1999 | Chase et al. | 709/201 |
| 5,963,915 | | 10/1999 | Kirsch | 705/26 |
| 6,026,394 | | 2/2000 | Tsuchida et al. | 707/3 |
| 6,049,829 | | 4/2000 | Li | 709/229 |
| 6,058,423 | * | 5/2000 | Factor | 709/226 |

OTHER PUBLICATIONS

IBM Technical Disclosure Bulletin, C. Mohan et al., "Method for Data Base Recovery in Client–Server Architectures," vol. 37, No. 06A, Jun. 1994, pp. 25–29.

IBM Technical Disclosure Bulletin, G. P. Copeland et al., "Microkernel Extension for Dirty Time Limit," vol. 37, No. 04B, Apr. 1994, pp. 229–230.

* cited by examiner

FIG. 2

| TYPE | LOGICAL LOCATION SERVER PROCESS | LOGICAL COMPUTER | I.D. WITHIN BIRTH COMPUTER |
|---|---|---|---|
| 54 | 56 | 58 | 60 |

FIG. 3

| TYPE | LOGICAL LOCATION SERVER PROCESS | LOGICAL COMPUTER | ID WITHIN BIRTH COMPUTER | |
|---|---|---|---|---|
| | | | BIRTH SEGMENT PREFIX | OFFSET WITHIN SEGMENT |
| 54 | 56 | 58 | 62 | 64 |

FIG. 4

SYSTEM AND METHOD FOR LOCATING RESOURCES IN A DISTRIBUTED NETWORK

RELATED APPLICATION

This application is related to a separately filed U.S. patent application Ser. No. 08/772,663, entitled "Distributed Computing Using Logical Processes" filed on Dec. 20, 1996.

This application is a divisional of U.S. patent application Ser. No. 08/772,705, filed on Dec. 23, 1996 by Michael E. Factor, now U.S. Pat. No. 6,058,423 which application is incorporated by reference herein.

FIELD OF THE INVENTION

The present invention relates to distributed computer networks, and more particularly, the present invention relates to a system and method for locating resources on a distributed network.

BACKGROUND OF THE INVENTION

In today's highly networked computer environments distributed computing is critical because it allows the resources of relatively small computers to be combined to provide a more powerful overall system. Distributed computing allows data and programs to be spread out, or distributed, across large networks of heterogeneous computers, in a manner that is transparent to the user. Thus, data that is too large to fit on a single computer may be broken into smaller pieces and stored on several computers, or processes that service a high volume of users may be spread out across the network to more efficiently service end-users.

Because of the need for flexibility with distributed computing environments, numerous logistical issues and problems arise. For example, while any two computers on such a network can communicate with each other on the network, the cost of communication may vary depending upon the computers involved and the topology of the communications network. Moreover, operations that appear to be fairly straightforward (e.g., processes for locating homepages on the World Wide Web) can become logistically difficult to manage where the environment is constantly changing (e.g., homepages moving to new physical locations). The problem associated with locating resources in any distributed environment is of particular concern and is addressed by this invention.

Typical distributed computing environments include clients, resource computers (e.g., servers), and resources. A resource is any entity available for a computer process to use as part of its computation. Resources may be physical (e.g., a robot arm) or logical (e.g., a database). Other examples of resources include a CD-ROM disk, a name server process, an object-oriented programming object, a location in a distributed shared memory and so on.

A resource can own another resource if it "contains" the owned resource. A resource contains another resource if performing a physical operation on the container (e.g., destroying it, etc), implies performing the same operation on the contained resource. For instance, a physical disk containing a collection of files owns all of the files on the disk or a region of distributed shared memory owns an object-oriented programming object allocated in the memory region, etc. For a resource to own another resource, the owning resource must be less abstract than the owned resource. Thus, physical resources, (e.g., a computer) can own logical resources, (e.g., a name-server process). Since physical resources (e.g., disks, robot arms, etc.) are not abstractions, they do not have owners.

At any point in time at most one computer in the distributed, computing environment controls each resource. The computer controlling a resource is the computer to which the resource is attached and the controlling computer has responsibility for mediating and enabling non-local accesses to the resource. Moreover, at any instance in time a resource need not be controlled (e.g., consider the case of a disk that is in a desk drawer). If a computer controls a given resource r, it also controls all of the resources owned by r. A resource is born on the computer which first controlled the resource. A resource server is a computer that controls one or more resources and which enables other computers in the distributed computing environment to access (a non-empty subset of) the resources it controls. Of concern here, are those resources which can be potentially be made accessible to other computers via resource servers.

Migration is a persistent change of either the owner or controller of a given resource. The controller of a resource is changed by detaching it from one computer and reattaching it to another (e.g., by physically moving a diskette from a drive on one machine to a drive on another machine). The owner of a (logical) resource is changed by destructively copying the logical resource (e.g., moving the backing store for a region of distributed shared memory from one device to another).

As noted above, tracking and locating resources can become logistically difficult on large distributed computing networks where migration occurs. Moreover, given the numerous places a resource could potentially migrate to (e.g., consider the web), the costs involved in locating resources can become practically unbounded. None the less, in distributed systems, clients often need to quickly find the machine controlling a remote resource.

One method of locating resources involves the utilization of a resource identifier (RID) to identify the resource. That is, if every resource has a unique identifier, the location of the resource could be encoded in the RID. However, because flexible distributed systems sometimes must change the machine controlling a resource, a system of dealing with migration must be employed. Previous approaches to finding resources that may migrate may suffer from numerous drawbacks including the potential of requiring unbounded communications, the need to suppot distributed garbage collection to (transparently) update existing RID's, the need to include a dedicated server, or the need to maintain a continued connection between the resource and its creating server.

The following documents each describe some form of resource tracking/locating, but each is subject to some of the above-mentioned limitations. J. Chase, H. Levy, E. Lazowska and M. Baker-Harvey. "Lightweight shared objects in a 64-bit operating system," OOPSLA 92: Conference on Object-Oriented Programming Systems, Languages and Applications, ACM/SIGPLAN 1992. p.397.; M. Day, B. Liskov, U. Maheshwari, and A. Meyers. "References to remote mobile objects in Thor." ACM Letters on Programming Languages and Systems, 2(1–4), Mar.–Dec. 1993. p115; J. Ioannidis, D. Duchamp, and G. Maguire, Jr. "IP-based protocols for mobile internetworking" Technical Report CUCS-006-91, Depaltment of Computer Science, Columbia University 1991; and "Universal Networked Objects," CORBA 2.0/Interoperability, OMG TC Document 95.3.xx, Mar. 20, 1995.

Distributed computing environments, including the internet, world wide web, intranets and large corporate networks, will continue to play a dominate role in computing. Efficient management of computing resources will be a primaly challenge in enabling such environments to fulfill the needs of the end-users. Thus, a need exists to provide an efficient system of tracking and locating resources. The aforementioned art is hereby incorporated by reference.

SUMMARY OF THE INVENTION

The present invention provides a method and system for managing resources in a distributed computing environment. Disclosed is (1) a system and means for building resource identifiers (RIDs), (2) a distributed process stiuctre for managing information regarding the location of computers and resources, and (3) a set of protocols that enable mapping from a RID to the machine controlling a resource in a small, bounded number of messages. These functional aspects are referred to herein collectively as the "Distributed Location Services" (DLS).

The present invention incorporates the notion of "logical processes," which were described in detail in the related application "Distributed Computing Using Logical Processes." The logical processes disclosures teaches, among other things, a logical addressing/mapping means which will allow the physical address of a device to be modified without modifying the resource identifier. Moreover, logical processes provide a flexible means for implementing the above-mention distributed process structure or LLSP's, described in more detail below. While the invention is disclosed in a generic sense, it is understood that the invention may apply to any distributed computing environment, including the world wide web, the internet, intranets, etc.

In accordance with the above, it is an advantage of the present invention to provide a highly scalable system for locating resources that may migrate.

In accordance with the above, it is a further advantage of the present invention to provide a small, bounded number of messages to find the controller of a resource.

In accordance with the above, it is a further advantage of the present invention to allow for resource migration without maintaining a connection with the creating server.

In accordance with the above, it is a further advantage of the present invention to provide a system that does not require garbage collection.

In accordance with the above, it is a further advantage of the present invention to provide a system that entails no overhead for access to local resources.

In accordance with the above, it is a further advantage of the present invention to provide a system that has minimal memory requirements.

PREFERRED EMBODIMENT OF THE INVENTION

A. DLS Overview

1. LLSP's

As noted, a fundamental aspect of this invention is the use of a distributed process structure, refeled to herein as logical location server processes (LLSP's), for overseeing some management aspects of computers and resources. The invention assumes that each physical process is identified, or associated with, a logical process. The physical process is a conventional operating system process that runs on a real machine and consumes resources (e.g., memory, CPU cycles, etc). Each logical process (i.e., the LLSP), is an abstraction which is the external view of the server. An LLSP may be implemented by different numbers of physical processes running on different machines at different points in time. DLS maintains a dynamic mapping between LLSP's and the implemented physical processes. All interactions with a server are with an LLSP. A lower level mechanism, described in the aforementioned related application, entitled "Distributed Computing Using Logical Processes" describes a system for maintaining the mapping between logical and physical processes. This related disclosure provides a flexible mechanism for managing LLSP's, which may need to exist at different physical locations at different points in time. To illustrate, a client, rather than use a physical address to identify a process, will use a logical address, in order to provide flexibility in the dynamic distribution of resources and computers on a network.

DLS paititions "responsibility" (which is defined in more detail below) for knowing the location of a resource among the LLSP's. In general, two LLSP's will share "responsibility" for tracking the location of each resource: one close to where the resource was created and one close to the machine currently controlling the resource. Additionally, the LLSP associated with the client (also defined in more detail below) may also, via some caching mechanism, know the location of a resource. DLS paritions responsibility in this way because it has been observed that if a resource migrates, there are three possibilities as to its destination: (1) close to its birth computer; (2) close to client computers that use the resource; or (3) some unrelated location. Experience with locality of resources in computer systems leads to the conclusion that the first two options are much more likely than the third. Nonetheless, pursuant to this invention, the client need only have a resource identifier in order to find a resource. If the location of a resource is not known by the birth computer of the resource, or in some implementations, the LLSP of the client, the LLSP of the birth computer will essentially "point" to the location of the resource. Information regarding the birth computer of a resource is encoded in its RID, which is discussed in more detail below.

As noted, the logical location server process (LLSP) is an abstraction which is the external view of a DLS server and DLS maintains a dynamic mapping between LLSP's and the "physical" process(es) implementing the LLSP. At any point in time an LLSP may be implemented by multiple physical processes—for instance if the workload on the LLSP is too great for a single process to serve, the work can be partitioned over multiple physical processes. Alternatively, a single physical process may implement multiple LLSP's, if, for example, the LLSP's are under-utilized. DLS can be made highly available by replicating the physical processes implementing the LLSP's using standard techniques.

Unlike physical processes, LLSP's live forever. Thus, the set of all LLSP's is monotonically increasing. This is possible since an LLSP is an abstraction and does not directly consume physical resources—other than its identifier—in the distributed computing environment. Each LLSP has an identifier that is universally unique among the set of all LLSP's and all communications with a DLS server are sent to an LLSP. The mechanism implementing the logical-physical process abstraction redirects the message to the appropriate physical process. Below are some definitions related to LLSP's. The "current LLSP of a computer" is the "closest" LLSP to the computer (i.e., the LLSP associated with the computer). Intuitively, "closest" should capture the cost of communication between the computer and the computers which may own the physical process(es) implementing the LLSP. Formally, however, the administrator defines the current LLSP of each computer, under the following constraints: (1) the mapping between computers and current LLSPs is many to one; and (2) the current LLSP of a computer changes (note that this constraint is later relaxed for the case where a computer moves). Thus, it is up to the administrator to determine the relationship between distance and the concept of a current LLSP.

The "current LLSP of a resource" at a particular instance in time is the current LLSP of the computer controlling the resource at that in instance in time. The concept of current LLSP of a recourse defines a partial partitioning. Only controlled resources have current LLSP's and at any point in time not all resources are controlled (e.g., a file owned by a disk that is not mounted).

The "birth LLSP of a computer" is the LLSP that was the computer's current LLSP when the computer was first configured. Under a relatively static topology of the computing network in which computers are allowed to be added and removed, but not allowed to migrate, a computer's birth LLSP and current LLSP will always be equivalent. Handling the case where computers migrate is discussed in detail below with regard to computer reconfiguration.

A resource's "birth LLSP" is the current LLSP of the computer on which the resource is born. It should be noted that (1) all resources born on a given computer have the same birth LLSP; (2) the mapping of resources to birth LLSPs defines a complete partitioning of resources; (3) the birth LLSP of a resource never changes during the life of the resource; and (4) a resource's current LLSP and birth LLSP are identical in the case where the resource has not migrated.

An LLSP has responsibility for a resource if it is guaranteed to be able to perform the mapping from the resource's RID to the computer controlling the resource (assuming that the resource is controlled). This responsibility is partitioned among the LLSP's using the concepts of birth and current LLSP. An LLSP has time-invariant responsibility for those resources for which it is the birth LLSP. At a particular instance in time, an LLSP has time-variant responsibility for those resources for which it is the current LLSP. The LLSP with time-invariant responsibility for a given resource never changes during the life of a resource. The LLSP with time-variant responsibility for a resource may change, in particular if the resource migrates, and it is possible for no LLSP to have time-variant responsibility for a resource, in particular if no computer controls the resource.

By defining time-invariant responsibility based upon the bilth LLSP (i.e., it keeps track of all resources born on computers "close" to the LLSP), the location of any resource can always be asceltained as long as the birth LLSP is known. Identifying the birth LLSP is accomplished by encoding the birth LLSP in the RID. Thus, a system is provided wherein a client can easily map from the RID to an LLSP. A driving motivation for giving the birth LLSP time-invariant responsibility stems from the usage assumption that resources either do not migrate or if they do migrate, a likely destination is "close" to where they were created.

In order to locate resources that migrate, each LLSP must keep track of the resources for which it is responsible in a data structure. To do this, the LLSP must maintain information regarding resources presently and formerly associated with the LLSP. While the exact nature and character of this information may vaiy depending upon the specific implementation, a detailed example is provided below.

2. RID's

All resources have unique resource identifiers (RID's); there is a one-to-one mapping between RID's and resources. The RID is a value (e.g., a sequence of bytes), that uniquely identifies the resource. Unlike a name, which is an external label that may be changed, a resource identifier is tightly and permanently coupled to the resource. All resources have precisely one RID that is assigned when the resource is created and which remains associated with the resource until the resource is destroyed. If a resource is at any point in time given a new RID, a new resource is (effectively) created and the old resource is (effectively) destroyed. All replicas of a replicated resource have the same RID. The RID identifies the object regardless of any migration that may have occurred. A resource is given its RID by its birth computer.

DLS defines an extensible architecture for constructing an RID as, for example, a dynamically typed, sequence of bytes. All RID's within the system must be constructed according to this predetermined architecture. Information contained in each RID may include, but is not limited to, information regarding the birth computer for the resource, the birth LLSP of the computer, and some means for uniquely identifying each resource born to the birth computer. Additionally, other details may be included (e.g., a sequence of bytes that determines how the other fields will be interpreted). As noted, the structure of resource identifiers allows responsibility for assigning a RID to be delegated to the resource's birth computer. Thus, no communication with DLS is required when an RID is assigned.

As implied by the architecture of an RID, we assume that all physical computers have a logical identifier. An RID can not be used as this identifier since the computer's logical identifier is part of the RID for resources born on the computer. This logical identifier uniquely identifies the computer over time.

Assuming that each LLSP is externally given a unique identifier, a computer's birth LLSP can assign the computer a logical identifier. When the computer is configured, it needs to contact its birth LLSP for its identifier. The LLSP should construct this identifier in a manner that ensures uniqueness among all the computers which have it as a birth LLSP (e.g., using a counter that is monotonically incremented each time the LLSP assigns a new computer a logical ID).

3. PROTOCOLS

There are two protocols or algorithms that are required for this invention. The first is executed when a resource migrates and the second is executed whenever a client wishes to determine the resource server for a given resource. The protocol utilized when a resource migrates generally involves updating the time-variant and time-invariant LLSP's. Specifically, the data structure of the birth LLSP, the former LLSP, and new (i.e., current) LLSP must be updated. This is discussed in more detail below with respect to FIG. 2.

Note that each LLSP keeps track of the resources for which it is responsible and which have migrated. If a resource has never migrated, there will be no data on the resource in any LLSP. DLS is only informed when a resource migrates. For resources that have not rigrated, their resource server remains their birth computer. Thus, given an RID about which DLS has no information, DLS will assume that the resource is controlled by the birth computer as encoded in the RID.

Prior to starting the protocol for locating a resource, the client separates the RID into its component pieces. It is assumed that a separate mechanism exists which the client can use to map from the logical identifier of the resource's birth computer (as extracted from the RID) to a resource server on the same computer. The preferred protocol (at least in the case where migration is uncommon) for finding a resource generally consists of first looking at the birth computer to see if it controls the resource. If unsuccessful, it then looks to the client's current LLSP to see if it knows the location or controller of the resource. If still unsuccessful, the current LLSP asks the birth computer's LLSP who controls the resource. If this final step is executed, the system should cache the response in the client's current LLSP.

The client's current LLSP may know the resource's current controller for any of the following reasons. First, it may be the LLSP with time-invariant responsibility. This is a reasonable possibility since resource's tend not to migrate and they tend to be used close to where they are located. Second, it may be the LLSP with time-variant responsibility. This is reasonable possibility under the assumption that resources migrate close to where they are used. Finally, the client's current LLSP may have the location of the resource in a cache.

The messages required to find the controller of the resource are thus limited to the messages sent from the client to its current LLSP and the message from the client's current LLSP to the time-invariant LLSP. This results in a bound of two-round trip messages to find the controller of a resource. The message sent to the resource's birth computer will enhance average performance if most accesses are for resources which have never migrated.

B. Detailed Description

Figure 1:
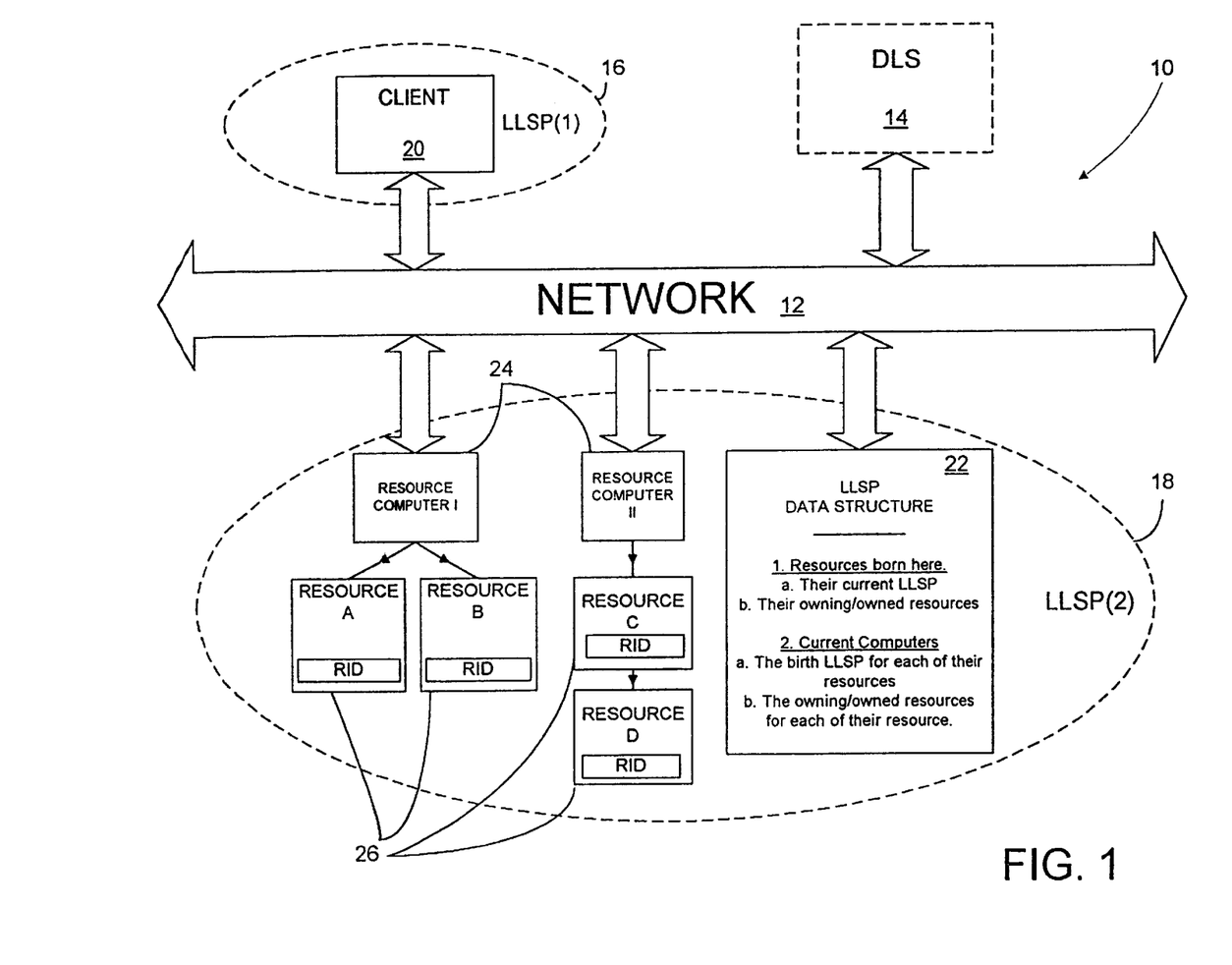
FIG. 1 depicts a block diagram of a distributed network system that includes distributed location services in accordance with a preferred embodiment of the present invention.

Referring now to the drawings, FIG. 1 depicts a networking system 10 that includes distributed location services (DLS) 14. Typical distributed networks include a plurality of clients, a plurality of resource computers or servers, and a plurality of resources controlled by the resource computers. Shown in the distributed network 12 of FIG. 1, is a portion of such a system with a client 20, a pair of resource computers 24 and numerous resources 26. In addition, it can be seen that each client, resource computer, and resource are associated with a logical location server process (LLSP). As noted above, LLSP's are abstractions that may be implemented by different numbers of physical processes running on different machines at different points in time. DLS maintains the dynamic mapping between LLSP's and the implementing physical processes. In this case, two LLSP's 16 and 18 are shown. The first LLSP 16 is associated with the client while the second LLSP is associated with resource computers 24 and resources 26.

Each LLSP includes with it a data structure 22 for keeping track of resources for which it is responsible. In this preferred embodiment, each LLSP must maintain a data structure that includes the set of resources which have this LLSP as their birth LLSP. For each of those resources that were born in this LLSP, the data structure must maintain the name of the current LLSP and the owning resource, if any, and owned resources, if any. In addition, the LLSP data structure must also include the set of computers which have this LLSP as their current LLSP. For each of those computers, the data structure must include the set of the resources controlled by the computer. For each resource, the data structure must include the birth LLSP of each resource and the owning resource, if any, and owned resources, if any. Beyond this data, in a specific implementation, each LLSP may maintain additional data (e.g., to take advantage of domain-specific knowledge).

Figure 3:
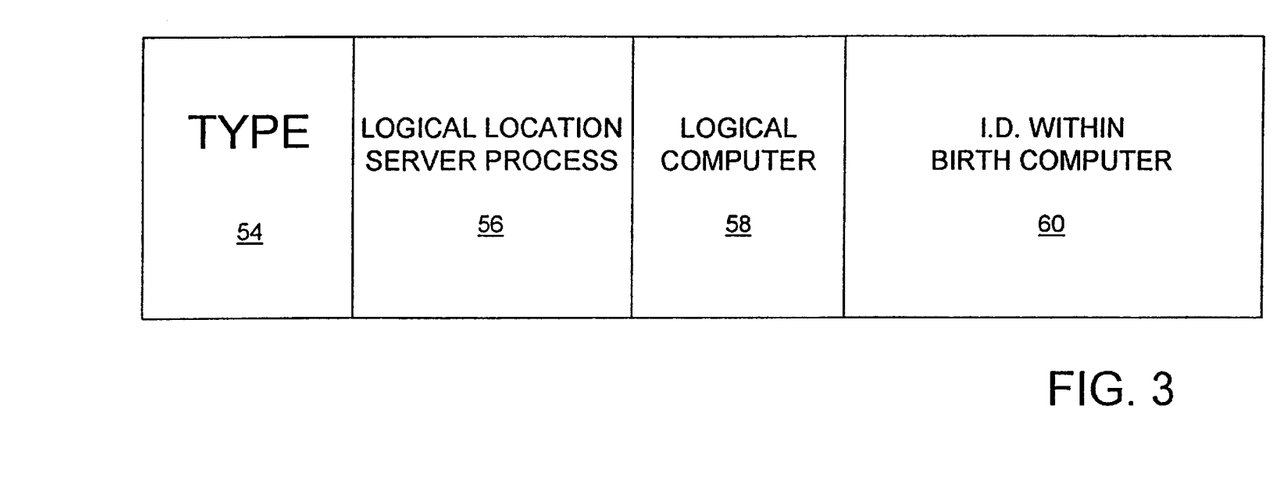
FIG. 3 depicts an architecture for a resource identifier in accordance with a preferred embodiment of the present invention.

In addition, it can be seen that each resource in this distributed network system 10 includes a resource identifier (RID). As noted above, every resource has a resource identifier that uniquely identifies the resource. The architecture of the RID's is discussed in (greater detail with regard to FIGS. 3 and 4.

It should be recognized that DLS 14 is not a single server process existing somewhere on the network, but rather it is a set of distributed servers located throughout the network in the form of LLSP's. DLS provides three (3) basic functions. First, it maintains a directory that maps from RID's to controlling resource servers for computers. Second, it provides an architecture for constIructing new resource identifiers or RID's. Finally, it provides a set of protocols for updating the servers when a resource migrates and for finding a resource from a RID. All of these functions may exist as one or more software programs recorded, stored, or being executed throughout the network as needed. Moreover, a dedicated DLS server may initially be used to launch all of the necessary software, and various functional aspects may later be transferred to other parts of the network as required.

Figure 2:
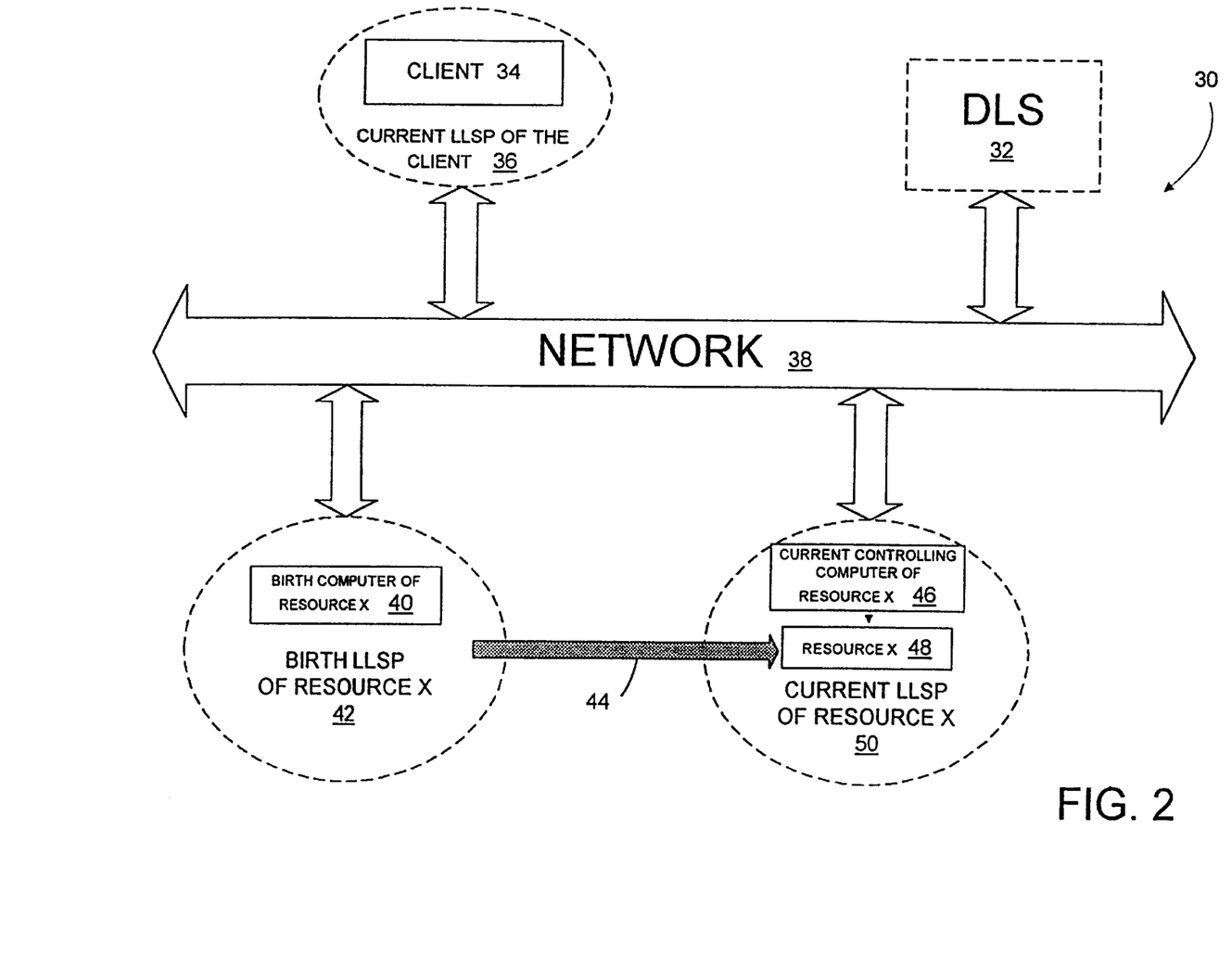
FIG. 2 depicts a block diagram of a distributed network system that further defines the server processes within distributed location services in accordance with a preferred embodiment of the present invention.

Referring now to FIG.2, the operation of distributed location services 32 is shown in more detail on distributed network system 30. Here, it can be seen that the network system 30 includes a client 34, a resource computer 40, a resource computer 46 and a resource 48. In this case, the resource 48 is referred to as resource X. In addition, there are three LLSP's shown in FIG. 2. The first LLSP 36 is the current LLSP of the client 34. The second LLSP 42 is the birth LLSP of resource X. The third LLSP 50 is the current LLSP of resource X. In this hypothetical situation, resource X was initially created or born under birth computer 40 and then migrated along path 44 to its current controlling computer 46. Thus, resource X has a birth LLSP 42, a birth computer 40, a current LLSP 50, and current controlling computer 46. As noted with regard to FIG. 1, both LLSP's 42 and 50 would include information in their respective data structures regarding the present location of resource X. Birth LLSP 42 would have time-invariant responsibility for resource X, while current LLSP 50 would have time-variant responsibility for resource X. If resource X were to at some future time migrate to a new LLSP, LLSP 50 would no longer have responsibility for maintaining or tracking resource X. However, birth LLSP 42 must always maintain information regarding the location of resource X.

In operation, if client 34 wants to locate resource X on the distributed network 30, it would use the following protocol. First, client 34 would send a message to the resource server on the resources birth system asking if it controls the resource. In this case, client 34 would send a message to birth computer 40 to see if birth computer 40 was still controlling resource X. If a positive response is received, the protocol is complete and the resource is found. It should be noted that these first two (2) steps are not necessarily essential for functional correctness. However, they are intended to provide and improve performance in the typical case, given the assumption that migration is unlikely. If the resource server fails to respond, or responds negatively, a message is sent to the client's current LLSP 36 asking which machine currently controls the resource. If the client's current LLSP knows the resources controller, it should provide that information to the client ending the search for the resource. If the client's current LLSP does not know the controller of the resource, it should send a message to the time-invariant LLSP (i.e., the birth LLSP of the resource) as encoded on the RID, asking who controls the resource. As noted above, each LLSP data structure maintains a tracking of all resources born in that LLSP. When this time-invariant LLSP responds to the client's current LLSP providing the location of the resource, the client's current LLSP should cache the response prior to fowarding it to the client. Thus, the next time a search is initiated for this resource, the client's LLSP may have the information.

When a resource migrates from one LLSP to another, DLS must execute the following protocol to maintain the necessary information in all relevant LLSP data structures. First, it must notify the time-invariant LLSP for the resource (as determined from the RID) that a new resource computer controls the resource. It must then notify the new or current LLSP of the new resource computer (e.g., computer 46) that the resource computer now controls the resource. The current LLSP of the resource will now have time-valiant responsibility for the resource. Finally, DLS must notify the old LLSP of the resource computer that used to control the resource that the resource computer no longer controls the resource. The old LLSP of the resource computer will cease to have time-variant responsibility for the resource. It should be recognized that the system assumes that it is likely that the three LLSP's which are notified are not distinct. The implementation will need to check for this and avoid sending duplicate messages.

C. Computer Reconfiguration

Finally, the case of computer reconfiguration is considered. As described so far, DLS is not semantically effected by the physical configuration of the computer network. Regardless of the physical location of a computer, the computer's current LLSP remains its birth LLSP. This can lead to a performance degradation, however, if a computer moves to be "far" from its birth LLSP.

There are two cases to consider. The first is what is typically considered mobile computing where a small client computer frequently moves with its user often over short distances (e.g., from the office to home) and occasionally over great distances). The second is when a non-portable computer is moved from one site to another. This movement is likely to be infiequent, but it is important to enable reconfiguration and administration of a distributed computing environment.

To handle these two cases, we modify the definition of current LLSP of a computer to be the LLSP that is "close" to a computer at a particular point in time. The current LLSP of a computer may change any time the computer disconnects and later reconnects to the network. As with our original definition, "close" is in the eyes of the administrator. Formally, the administrator defines the current LLSP of each computer where the mapping between computers and current LLSP's is many to one.

Note that the current LLSP of a computer need no longer be equal to its birth LLSP. Because it is assigned a new current LLSP after it moves, the computer or LLSP associated with the client that is contacted in the resource location protocol will be an LLSP close to the client at a particular instance in time and not its birth LLSP.

Figure 4:
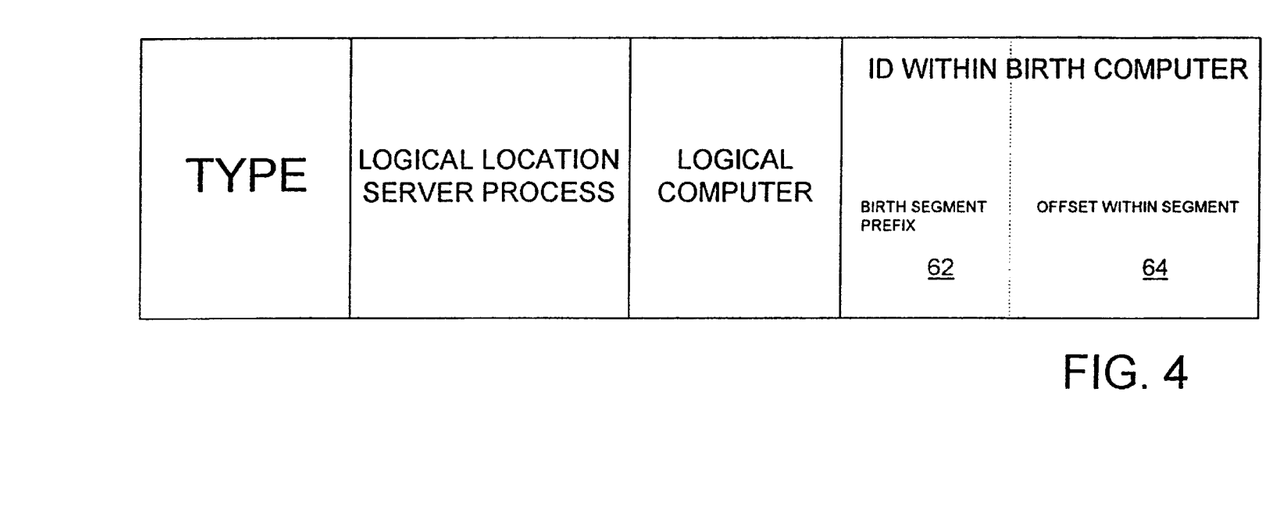
FIG. 4 depicts an alternate embodiment of a resource identifier in accordance with the present invention.

While the above change prevents performance degradation when a client computer moves, as defined so far, the system is still subject to performance degradation if a resource server moves. To address this, when a computer that is a resource server has its network attachment changed, such that its current LLSP changes, the resource server will be assigned an additional logical identifier. This logical identifier will be composed of its new current LLSP, along with a new unique identifier assigned by the LLSP. The resource server will use its new identity in assigning future RIDs. FIG. 4 depicts one possible example of this structure.

D. Specific Applications

1. SAS/DPS

It is envisioned that DLS could function as the location server for Shared Address Space seivices/Distributed Persistent Storage services (SAS/DPS). SAS/DPS, from the perspective of DLS, implements a persistent, distributed shared memory. The role of DLS is to find the computer controlling a page of distributed, shared, persistent memory given a thirteen-byte DPS address for the page. In this case, the RID is the thirteen byte address and the resource is the page. To enable SAS/DPS to be persistent, a persistent media (e.g., a disk) owns each page of SAS/DPS storage. Additions to the DLS algorithnms described above allow sets of pages to be treated as units.

When used as pair of SAS/DPS, DLS is called under the covers of find pages in the distributed persistent store. DPS allows tasks on different machines to access each other's machine-scoped, persistent, single-level store as implemented by SAS. When a machine using SAS/DAS takes a page fault, the page fault handler determines if the page is controlled by the faulting machine. If not, the page fault handler contacts DLS to determine which machine controls the page. The controlling machine, as identified by DLS, is contacted by the faulting machine and the faulted upon page is cached.

As used in SAS/DPS, the basic architecture of DLS is extended by architecting the last field of the RID. Instead oftreating the identity of the resource born on a computer as an arbitrary, unique value (as shown FIG. 3), we architect the fouith field of the RID to have two sub-fields. FIG. 4 shows that the fourth field has been divided into a segment prefix and an offset within the segment. The set of SAS/DPS pages whose RID's differ only in the value of the segment offset are assumed by DLS to move as a group.

2. World Wide Web

The world-wide-web is mechanism for providing worldwide hypertext documents. Documents are linked together using uniform resource names (URL's), which are effectively pointers to the documents. Currently the structure of URL's is such that documents cannot easily migrate. URL's encode the (symbolic) name of the machine controlling the resource. If the controller of a resource changes, any existent URL's become invalid.

Instead of using URL's that encode the symbolic name of the resource's controller, it is conceivable to use DLS and RID's as described above. The RID will essentially be the URL. This will allow the controller of a resource to change without invalidating any existing links to the resource. Presently, there are attempts being made to replace URL's with uniform resource names (URN's). Written proposals and other "Internet-drafts" presently exist. (e.g., see RFC 1737, K. Sollins, L. Masinter, "Functional Requirements for Uniform Resource Names", Dec. 20 1994, which is incorporated by reference).

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in the light of the above teaching without depailing from the spirit and scope of the following claims.

I claim:

1. A method of finding a resource on a distributed network from a client wherein said resource has a unique resource identifier associated therewith and the client knows the resource identifier, and wherein each resource, computer, and client has a unique current logical location service process associated therewith, and wherein said resource identifier includes information regarding a birth computer and birth logical location service process of said resource, said method comprising the steps of:

sending a message to the birth computer of said resource to determine if said resource is controlled by said birth computer;

checking a response from said birth computer, for the case where said resource is not controlled by said birth computer, sending a message to said logical location service process associated with the client to determine if it knows who controls said resource;

checking a response from said logical location service process associated with the client;

for the case where said logical location service process associated with the client does know the identity of the computer controlling said resource, sending a message to said birth logical location service process of said resource to determine who controls said resource.

2. The method of claim 1 further comprising the step of caching said response from said logical location service process associated with the client when said logical location service process associated with the client knows the location of said resource.

* * * * *